May 8, 1928.

B. KOOLS

POTATO AND VEGETABLE CUTTER

Filed April 27, 1927

1,669,092

Inventor:
Bernard Kools

Patented May 8, 1928.

1,669,092

UNITED STATES PATENT OFFICE.

BERNARD KOOLS, OF APPLETON, WISCONSIN.

POTATO AND VEGETABLE CUTTER.

Application filed April 27, 1927. Serial No. 186,939.

This invention relates to potato and vegetable cutters.

Objects of this invention are to provide a vegetable cutter particularly adapted for cutting potatoes in the julienne style, and which is so constructed that the potato is alternately cut in elongated strips, so that the entire face of the potato is gradually cut away in a uniform and even manner.

Further objects are to provide a simple type of device for accomplishing the above noted results and one which is composed of a small number of easily cleaned parts.

Further objects are to provide a device which may be relatively cheaply manufactured and easily assembled by ordinary machine shop processes.

An embodiment of the invention is shown in the accompanying drawings in which:—

Figures 1, 2, 3:
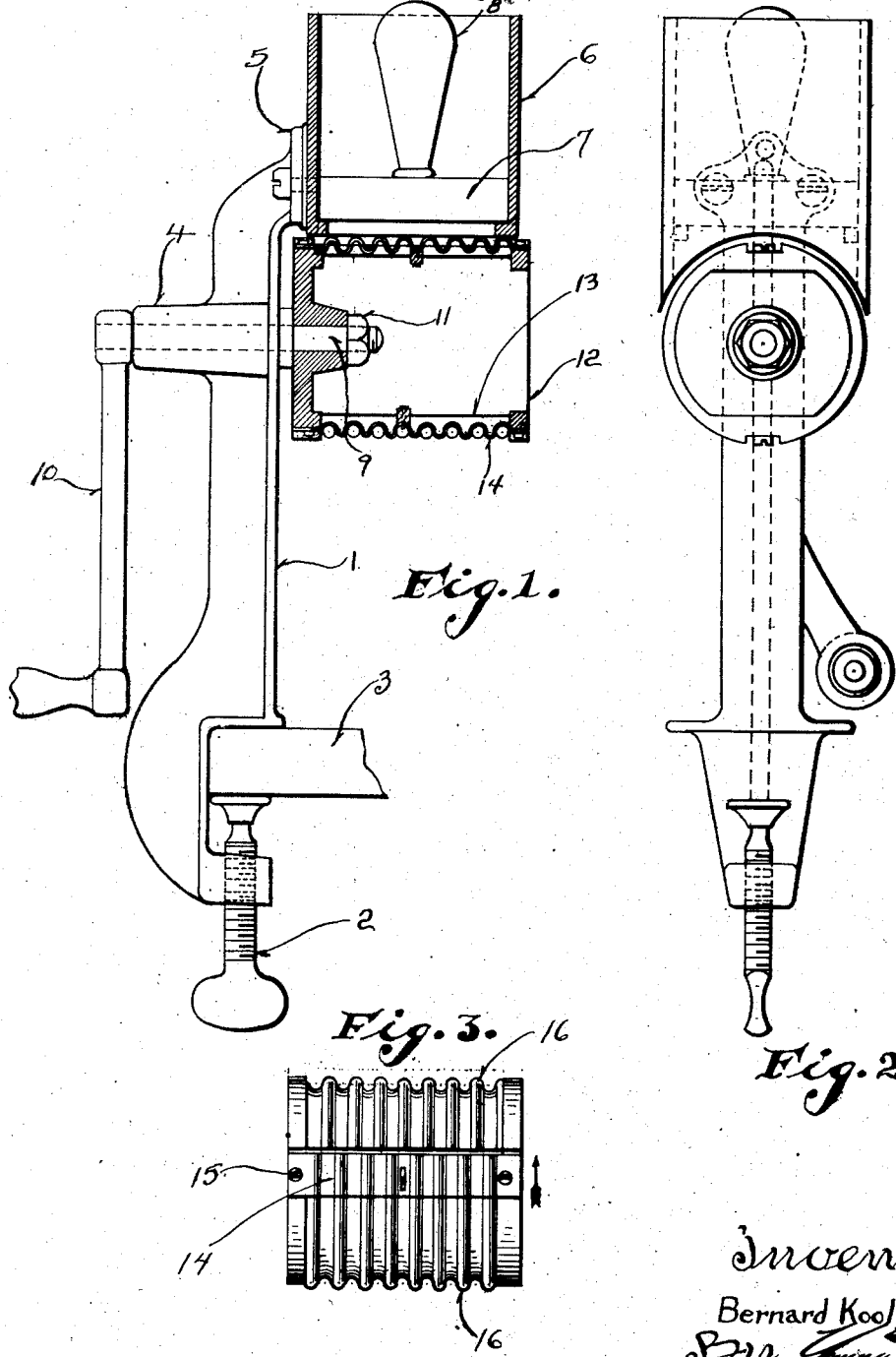
Figure 1 is a side elevation partly in section of the potato cutter.
Figure 2 is an end view thereof.
Figure 3 is a view of the rotating drum removed from the device.

Referring to the drawings, it will be seen that the device is provided with a vertical standard 1 equipped with a clamping screw 2, whereby it may be attached to a table top or other support 3. This standard is equipped with an elongated bearing 4 and with an upwardly extending bracket 5. The bracket 5 carries the rectangular hopper 6, within which the potatoes are to be placed, such potatoes being preferably pressed downwardly, by means of the plunger 7, equipped with the manipulating handle 8.

The elongated bearing 4 carries a shaft 9 which is equipped with a manipulating crank 10 at its outer end. The inner end of the shaft is threaded and receives the locking nut 11. The shaft carries a drum 12, which is held in place by means of the locking nut 11, such drum being closed at its inner end and open at its outer end.

The drum is provided with a pair of transverse slots 13 at diametrically opposite points and carries fluted knives 14. These knives are held in place by means of the screws 15, as shown in Figure 3. It is to be noted, particularly from reference to Figure 3, that each half of the drum is provided with ribs or ridges 16, which are positioned adjacent and behind the upwardly extending loops of the corresponding knife 14. These ridges 16 are staggered on opposite sides of the drum, and the knives are also correspondingly staggered with reference to their upwardly extending fluted or looped portions. Thus, when one of the knives cuts a series of shreds or stringers from the potato, it leaves curved channels in the potato within which the ribs 16 ride, thus holding such potato against lateral motion. The next knife presented cuts the intermediate portion between the channels previously formed in the potato. In this way the entire face of the potato is uniformly cut away by means of the alternately acting knives and their staggered outwardly looped or fluted portions.

The operator runs no danger of cutting his fingers due to the plunger 7 by means of which he is enabled to press the potatoes downwardly into engagement with the rotating drum.

The device is extremely simple, as will be readily appreciated from the description given and may, consequently, be readily cleaned and kept in a sanitary condition.

Further, it may be very cheaply produced by ordinary machine shop processes.

It is to be noted further that the device will effectively and rapidly produce the desired shredded form for the potatoes.

Although the invention has been described in considerable detail, such description is intended as illustrative rather than limiting as the invention may be variously embodied and as the scope of such invention is to be determined as claimed.

I claim:

A vegetable cutter, comprising a supporting member and having an elongated bearing, a shaft mounted within said bearing and carrying at one end a drum-like member and at its other end a driving member, a hopper mounted above said drum and adapted to receive vegetables, said drum having diametrically opposite slots, fluted knives mounted within said slots, and having outwardly looped portions staggered with reference to each other, said drum having a series of ribs extending approximately half way around such drum with one set of ribs aligning with the outwardly looped portions of one knife and the other set of ribs aligning with the outwardly looped portions of the other knife.

In testimony that I claim the foregoing I have hereunto set my hand at Appleton, in the county of Outagamie and State of Wisconsin.

BERNARD KOOLS.